Dec. 14, 1965 H. H. DEIST 3,223,573

APPARATUS FOR APPLYING UNVULCANIZED RUBBER MATERIAL TO A TIRE BODY

Filed Sept. 18, 1962 3 Sheets-Sheet 1

Dec. 14, 1965 H. H. DEIST 3,223,573
APPARATUS FOR APPLYING UNVULCANIZED RUBBER
MATERIAL TO A TIRE BODY
Filed Sept. 18, 1962 3 Sheets-Sheet 2

Dec. 14, 1965 H. H. DEIST 3,223,573

APPARATUS FOR APPLYING UNVULCANIZED RUBBER MATERIAL TO A TIRE BODY

Filed Sept. 18, 1962 3 Sheets-Sheet 3

United States Patent Office 3,223,573

Patented Dec. 14, 1965

3,223,573

APPARATUS FOR APPLYING UNVULCANIZED RUBBER MATERIAL TO A TIRE BODY

Herbert H. Deist, Akron, Ohio, assignor to The Firestone Tire & Rubber Company, Akron, Ohio, a corporation of Ohio Filed Sept. 18, 1962, Ser. No. 224,459
7 Claims. (Cl. 156—396)

This invention relates generally to the art of applying unvulcanized rubber material to tire carcasses such as, for example, is required in building a tire. More specifically, the invention is directed to applying rubber material as may be carried out in building the sidewalls, tread base or tread shoulders of a vehicle tire and contemplates a method and apparatus capable of performing such method so that different rubber stocks, each having individual characteristics specifically selected as being best suited for a predetermined portion of the tire, may be applied to be formed into the respective predetermined portions for which they are selected.

Conventional techniques for forming the tread portion and the sidewall portions in building a new tire or in renewing the tread portion on a used tire carcass employ an extruded solid strip of rubber having the full cross section of the tread or in new tire building, having the full cross section of the tread with the sidewall portions integral therewith. This extruded solid strip is cut into an appropriate length to wrap around the exterior of the carcass with the cut ends of the strip intended to meet to form a butt splice. Many problems and difficulties are encountered in employing these techniques including the requirement of heavy, powerful and expensive extruding equipment for producing the full solid strip of rubber as well as skilled operators to produce and maintain the exact required cross sectional contour for the strip. Another difficulty arises in obtaining the proper cut length of the solid strip so that the strip will completely encompass the carcass and just butt the cut ends without overlapping of the cut ends or leave space remaining between the cut ends so that the strip must be stretched to have its ends joined. Either eventuality interferes with the obtainment of proper balance in the final finished tire.

Without discussing numerous other problems encountered in attempting to build the sidewall and tread rubber portions of a tire by employing the solid extruded strip technique as referred to above, it may be noted that from the standpoint of wear, material cost and conditions to which the rubber portions of the tire will be exposed in service, there are disadvantages in employing a solid extruded strip made up of a single rubber stock composition. In this respect, the tire building arts have advanced to the point where the rubber to form the tread and sidewall portions may be formed from two different rubber stocks, one a tread stock which is extruded in a form to provide the tread portion of the tire and the second, a sidewall stock which is extruded and laminated with the tread portion so as to be combined in a composite strip having the desired cross sectional contour for building the tire. This technique raises its own problems, such as in obtaining effective uniting of the extruded tread portion and extruded sidewall portions into the desired composite unitary solid strip and in handling the bulky, heavy composite strip during application to the tire carcass and in obtaining the proper butt joint between the cut ends of the strip as mentioned above.

The instant invention seeks to overcome and alleviate the above discussed problems and difficulties while at the same time providing for rapid and automatic building of the sidewall and tread rubber portions on a tire carcass. In this endeavor, the invention enables the use of different rubber stocks each having individual characteristics selected to be best suited for forming a predetermined portion of the vehicle tire rubber. For example, these rubber stocks may be selected on the basis of maximum suitability for the service conditions to be encountered and minimum cost for each of the sidewalls, the tread base and the tread shoulders that are to be applied on a tire carcass. As described in more detail hereinafter, the invention employs calendering of the selected rubber stocks and applying a calendered strip of sidewall stock to the tire carcass of a width such as to cover the carcass between the desired lateral edges of the tire sidewalls, applying a narrower calendered strip of tread base stock centrally overlying the strip of sidewall stock and thereafter applying calendered parallel strips of tread shoulder stock overlying the strip of tread base stock and spaced thereon so as to be formed by subsequent molding into the tread shoulders in the finished vulcanized tire. It may be noted that by employing relatively thin calendered sheets in accordance with the instant invention as compared with the conventional thick solid extruded strip, the existence of a slight overlap at the cut ends of the strip is not serious and the overlapped or butted joints of successive layers of the rubber strips applied in accordance with this invention can very easily be staggered around the circumference of the tire to avoid the occurrence of a heavy rubber build up at any particular point on the tire circumference.

The apparatus of the instant invention may generally be described as employing a rotatable turret assembly, the turret carrying a rotatable mandrel which supports the tire carcass, or body, during application of the rubber material thereto and with a calender provided adjacent the turret assembly for each rubber stock to be applied to the tire carcass, the calender having trimming means to segregate a strip of material of desired width from the calendered sheet produced on the calender for application to the tire carcass. Roll means mounted to be engaged by the tire carcass and press the strip against the carcass in applying it thereto is also provided along with a cut-off knife means to sever the strip after a desired length has been wound on the tire. Transfer means may also be included in the apparatus to transfer the segregated strip from the primary calender rolls to the roll means where the relationship of these parts dictates its need.

The instant invention has for its principal object the provision of method and apparatus wherein maximum speed and uniformity in build up of a desired tire tread shape may be obtained and also wherein different rubber stocks for different portions of the tire may readily be employed.

Another object resides in the advantages of the invention whereby strips of selected rubber stocks having different characteristics are applied by being wrapped one or more turns in succession around the tire carcass in predetermined positions and with the strips being of predetermined size to provide the proper quantity and disposition of each rubber stock in the molded finished tire.

It is also an important object of the instant invention to provide apparatus wherein the application of unvulcanized rubber material to a tire carcass may be expeditiously and automatically carried out.

A further object of the invention resides in the provision of a multiple station machine where tire carcasses built up of rubberized tire fabric and beads as formed by conventional techniques may be loaded onto the machine and at successive stations the sidewalls, tread base and tread shoulders applied in sequence whereafter the tire is unloaded in condition to be molded into the finished tire shape.

It is also an object of this invention to provide a multiple station rotatable turret wherein each material application station between loading and unloading stations disposed around the turret includes a calender equipped with transfer means to transfer a strip of calendered rubber material to roll means to apply the strip to a tire carcass, trimming means associated with the calender to segregate the desired width of rubber strip and cut-off means associated with the calender to sever the strip after the desired length thereof has been applied to the tire carcass.

The above and other objects of the instant invention will be more readily apparent by reference to the accompanying drawings in which a preferred embodiment is disclosed by way of example, various modifications and changes in details thereof being contemplated within the scope of the appended claims. One form of the apparatus for carrying out the invention is illustrated on the accompanying drawings in which:

Figures 1, 3:
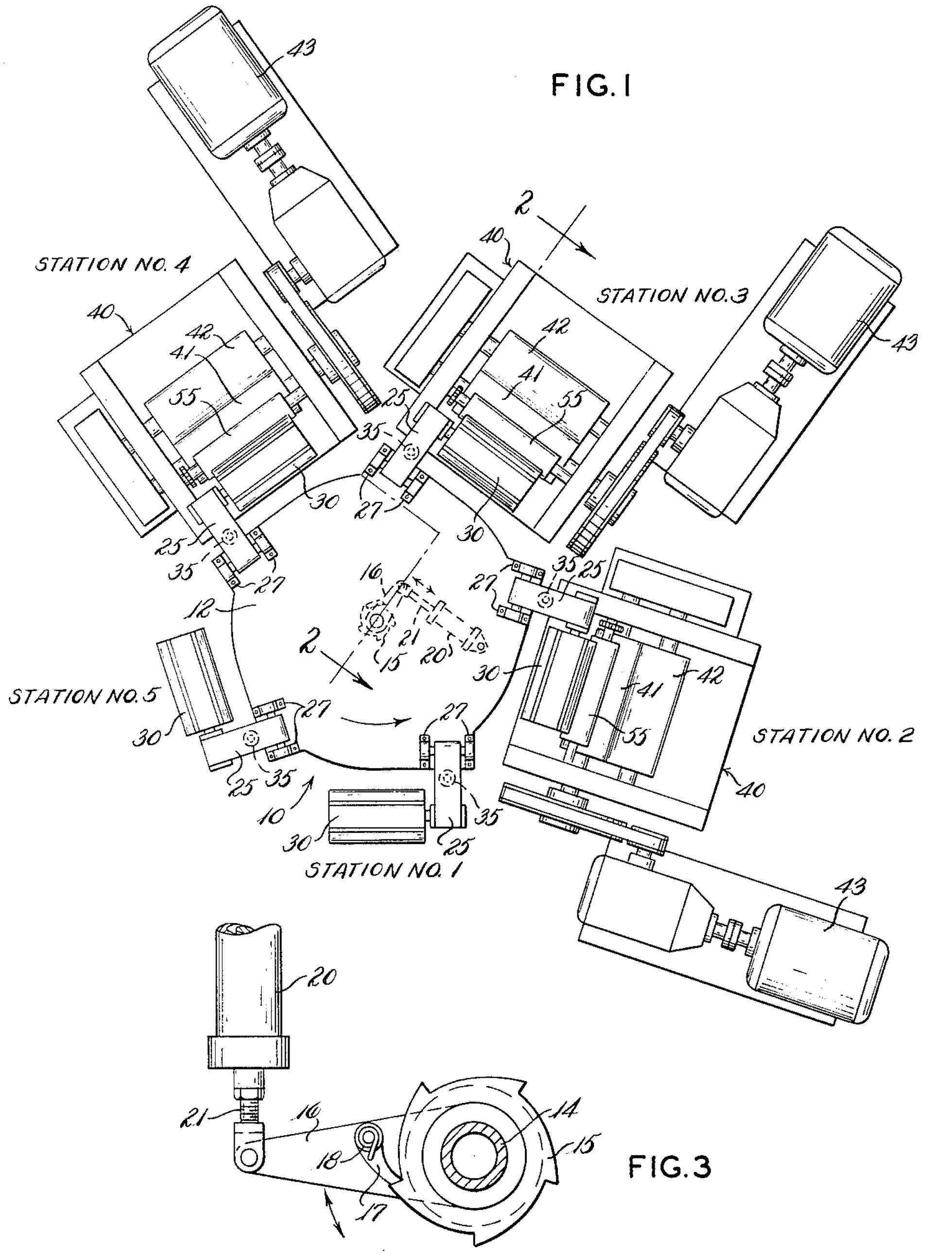
FIGURE 1 is a plan view of the turret assembly and components mounted at each of the stations surrounding the turret assembly with certain details of construction omitted to facilitate illustration of the invention.
FIGURE 3 is a sectional view taken on line 3—3 of FIGURE 2.
Figure 4:
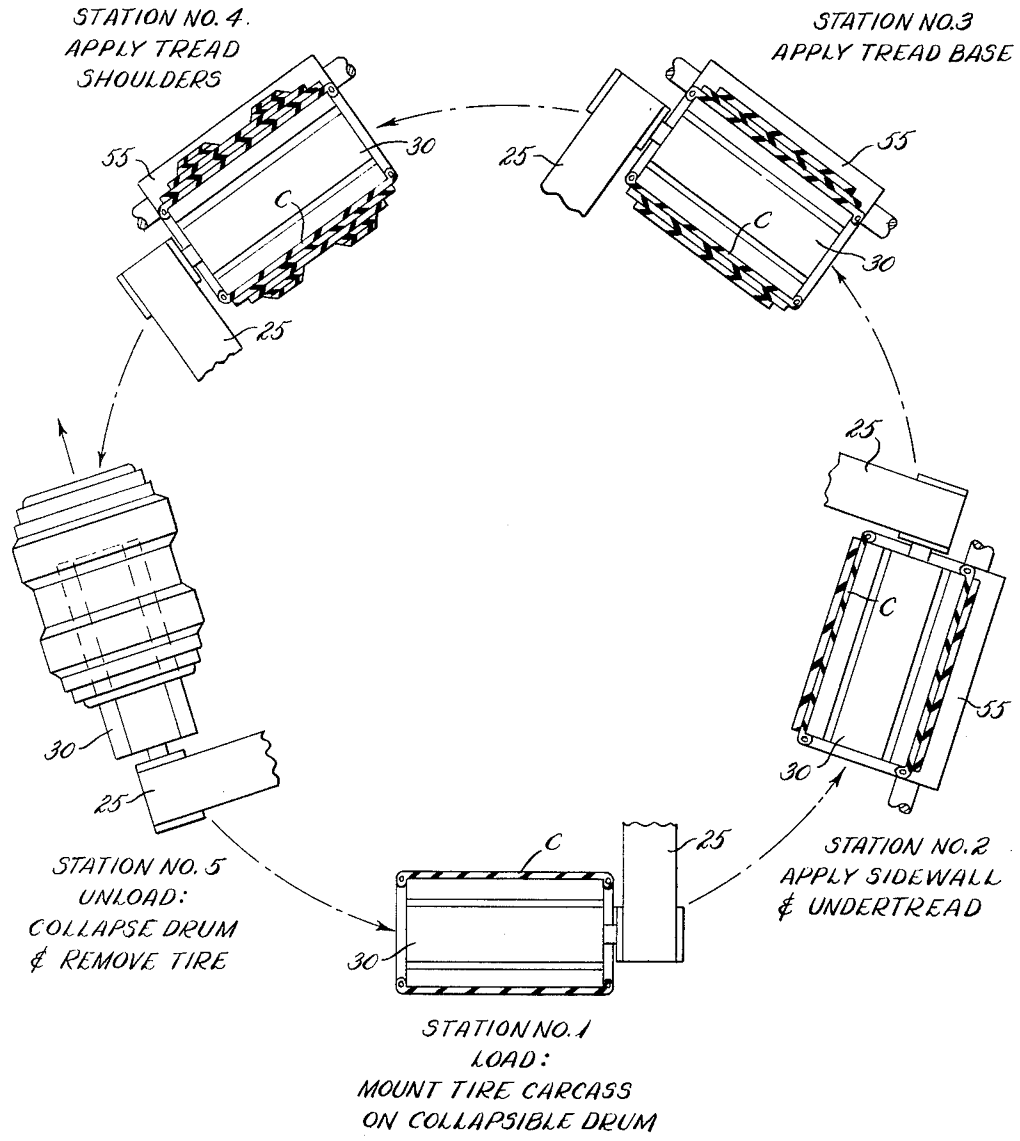
FIGURE 4 is a schematic plan view illustrating the various stages in applying unvulcanized rubber material to a tire carcass.

Before undertaking a detailed description of the parts and components incorporated into the apparatus shown on the drawing, it may be noted that FIGURE 1 on the drawings best illustrates the apparatus whereby unvulcanized rubber material is applied to a tire carcass and FIGURE 4 shows in section the successive stages of material build up through which the tire carcass progresses in operation of the apparatus. In the case of building a new tire, the generally cylindrical tire carcass formed in any conventional manner to include the usual overlapped rubberized fabric plies with the beads at the ends of the carcass band will have the sidewall rubber, the tread base rubber and the tread shoulder rubber wound thereon to complete the tire in readiness for its being formed into the final toroidal shape with the desired tread design molded therein. It may be noted that although the apparatus illustrated and the method as specifically described are especially designed for use in the building of new tires and in this connection, the invention finds particular advantage by offering economy and speed in tire production, the invention is also applicable in applying unvulcanized rubber material to used tire carcasses that have been prepared by the normal operations incidental to retreading tires.

Referring again to FIGURES 1 and 4, it will be noted that a turret assembly 10 is provided with a series of stations numbered 1 through 5 spaced around the periphery thereof. It may be noted that to facilitate illustration of the invention, the collapsible drums which are to hold the tire carcasses during the operations performed in applying the rubber material are shown in FIGURE 1 without tire carcasses mounted thereon while FIGURE 4 omits most of the details of the turret assembly 10 and shows in cross section the various stages of the tire carcasses as the rubber material is applied at the different stations surrounding the turret.

Station No. 1 on the turret assembly provides for loading the apparatus and at this station the tire carcass C is mounted on a collapsible drum which supports it during the various work operations performed at the various succeeding turret stations. Station No. 2 provides a work location where a strip of appropriate width and desired rubber stock is applied to form the sidewalls of the tire and undertread. Station No. 3 follows station No. 2 and disposes the tire carcass for application of a strip of appropriate width and rubber stock to form the tread base. Station No. 4 offers a work location whereat the tread shoulders are applied over the tread base and sidewall strips previously built on to the tire carcass. Station No. 5 is provided to permit unloading the tire carcass from the collapsible drum. After removal of the tire from station No. 5, it may be handled by well known techniques operable to form it into its finished toroidal shape and mold the tread rubber into the desired tread design.

Description of the structure of the turret assembly and components disposed at the material application stations intermediate the material loading and unloading stations Nos. 1 and 5, respectively, may now be described. It will be appreciated that no attempt has been made on the drawings to illustrate final structural details of the apparatus but instead, the apparatus has been shown in simplified form to best convey the concept of operation contemplated for use of the invention.

Figure 2:
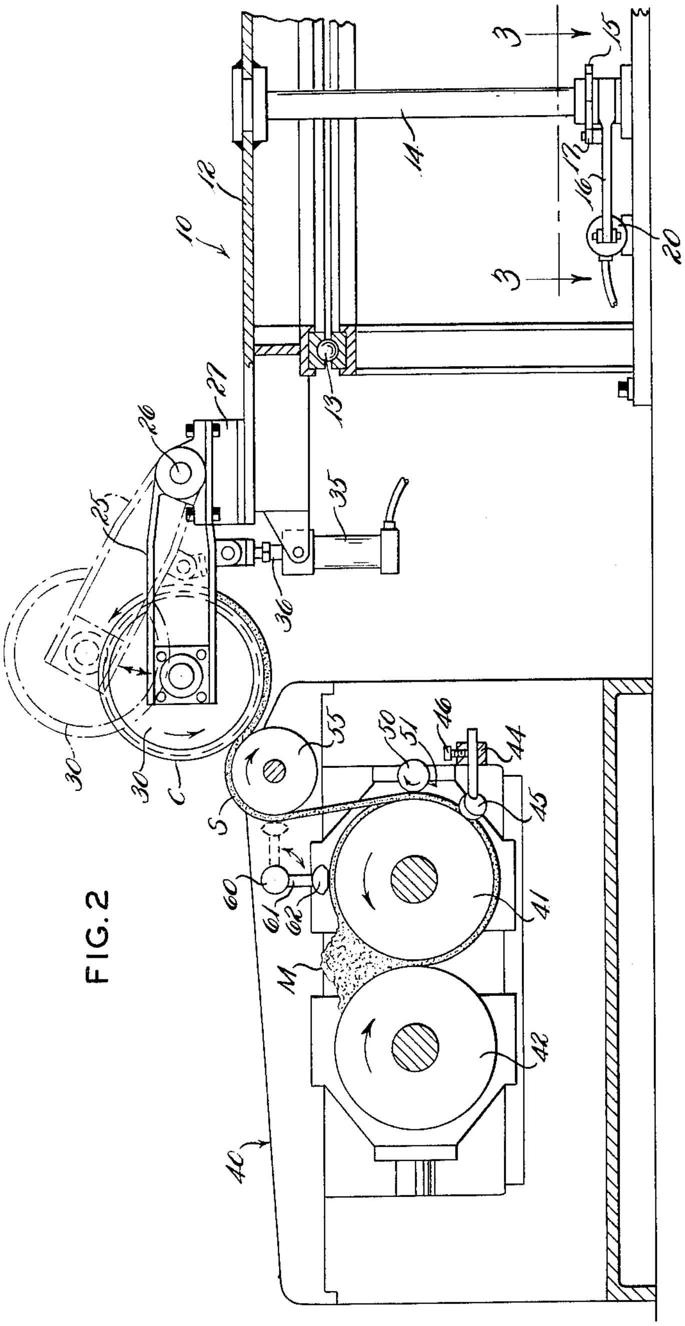
FIGURE 2 is a sectional view taken generally on line 2—2 of FIGURE 1.

In FIGURES 1 and 2, the turret assembly 10 includes a horizontal turret table 12 mounted on suitable anti-friction bearing means 13 to be rotatable about a vertical axis extending longitudinally through a shaft 14. Shaft 14, fixed at its upper end to table 12, extends downwardly to the base of the assembly and has a ratchet wheel 15 secured to its lower end. An arm 16 pivotable about the lower end of shaft 14 carries a pawl 17 biased by spring 18 toward engagement with the ratchet teeth of wheel 15. An extensible actuator 20 having its cylinder secured at one end to the base of the assembly has its actuating rod 21 connected to the outer end of arm 16. It may be appreciated that by introduction of fluid pressure into the cylinder of actuator 20, the actuating rod 21 will be moved to swing arm 16 and, in turn, impart indexing movements to the turret table 12 through shaft 14 and ratchet wheel 15.

At each of the five stations surrounding the turret assembly, there is mounted a work carrying arm 25 which is journaled at its inner end to a shaft 26 as shown in FIGURE 2, the shaft being supported at the periphery of turret table 12 by mountings 27. The outer end of arm 25 rotatably supports a mandrel 30 which in the embodiment illustrated may take the form of a collapsible drum such as referred to hereinbefore and such as are conventionally employed in present day new tire building operations. This mandrel, or where a collapsible drum is employed to form the mandrel, rotatably supports the tire carcass while it is being worked on and the unvulcanized rubber material being applied at the various material application stations.

Each arm 25 has an extensible actuator 35 mounted on the turret table 12 beneath the arm with the actuation rod 36 thereof connected to the underside of the arm. Thus, by appropriate control of the introduction of fluid pressure into and out of the cylinder of actuator 35 the arm can be raised and lowered to move the tire carcass into material applying position or raise the tire carcass preparatory to indexing the turret assembly to the next work station, the indexing operation being carried out under control of extensible actuator 20 as described above.

As shown in FIGURE 1, each of stations numbered 2, 3 and 4 surrounding the turret assembly include generally similar components. For purposes of description, reference may be made to the components at station No. 3 which are illustrated in plan on FIGURE 1 and in section on FIGURE 2. It should again be observed that for more effective illustration, certain of the component details are not shown in both FIGURES 1 and 2.

At station No. 3, and likewise at stations Nos. 2 and 4, a rubber mill or calender 40 is provided. A simple two-roll calender wherein the primary calender rolls 41 and 42 are driven by an appropriate drive motor 43 is illustrated. In the calender construction, the roll 41 may be fixedly mounted whereas roll 42 may be adjustable toward and away from roll 41 to determine the thickness of the calendered sheet which is produced by operation of the calender.

A mass of unvulcanized rubber material M is deposited at the bite of the rolls 41 and 42 and as is well understood in calender operation, the rotation of the rolls works and masticates the material forming it into a calendered sheet, such a sheet being shown in FIGURE 2 as encircling roll 41.

The calendered sheet formed at the bite of the calender rolls of each calender desirably will have a predetermined thickness such as dictated by the general thickness or quantity of rubber material needed to properly build up the predetermined portion of the tire where the rubber stock from the particular calender is to be employed. As the calender operates, the material is formed into a continuous sheet of a thickness determined by the spacing between the calender rolls 41 and 42 and it is from this sheet that a strip of desired width is segregated and cut to the desired length in application of the rubber material to the tire carcass.

To segregate a strip S of desired width from the calendered sheet, the calender 40 carries a bar 44 extending generally parallel to roll 41 with spaced trimming knives 45 supported on this bar and each held in place by a suitable set screw 46. It will be understood that for each strip to be segregated from the calendered sheet, a pair of knives 45 will be provided and mounted on bar 44. As the calender roll 41 rotates, the knives 45 slit the sheet, it being understood that the edges of these knives lightly rest against the external surface of the calender roll 41. Obviously, the width of the strip that is segregated is determined by the space between adjacent trimming knives 45.

Although fixed spacing between trimming knives 45 has been shown, it may be desirable in building up the rubber material from several turns around the carcass of a segregated strip to have the strip of varying width such that, for example, tapering sides of the accumulated layers of these turns will be provided. Such a tapering build up is shown on FIGURE 4 with respect to the tread shoulders on the carcass at stations Nos. 4 and 5. Similarly, it may be desirable to build up by using more than one strip turn around the carcass to form the sidewalls or tread base and vary the width of the strip to obtain the desired coverage and positioning of the rubber stock that the particular strip is composed of. In such instances appropriate programmed variation in the spacing between adjacent knives will be provided for, coordinated with operation of the calender 40, so that the desired width of strip segregated by the trimming knives will be varied to give the predetermined appropriate build up of the turns of the strip on the tire carcass.

To cut the end of the strip S which is to be applied by wrapping the strip one or more turns around the tire carcass, there is provided a cut-off roll knife 50 carrying a blade 51. This cut-off means may be provided by a rotatable shaft extending across parallel to the calender roll 41 with the blade 51 of required longitudinal length for the width of the strip to be cut and protruding from the rotation axis of the shaft such that rotation of the shaft will cause the blade 51 to cut into the segregated strip, cutting the end of the strip so that it may be pulled free of the calender roll for application to the tire carcass. The roll knife 50 will also be operated to cut the trailing end of the strip once a required length of strip has been wound onto the tire carcass. It will be recognized that appropriate programming of the operation of roll knife 50 can be employed as desired to time its operations in proper sequence to the functioning of other parts of the apparatus.

In the embodiment illustrated, means has been shown for effecting transfer of the strip from the calender roll 41 to an applying roll 55. Applying roll 55 is rotatably mounted on a shaft in a position such that the indexed location of the turret assembly will dispose one of the mandrels 30 to be lowerable to engage the tire carcass carried thereby with applying roll 55 whereupon the strip of rubber material can be pressed onto the tire carcass as the applying roll 55 is rotated. Roll 55 is driven appropriately from the drive for the calender by motor 43, this roll preferably having a peripheral speed closely controlled relative to the peripheral speed of the calender rolls so that the strip of rubber material transferred from the calender rolls is not distorted or stretched materially upon being removed from the calender roll to be applied to the tire carcass. It may also be mentioned that with the tire carcass on mandrel 30 pressing firmly against roll 55, the rotation of roll 55 not only serves to impart rotation to the carcass, but also the pressure between the carcass and roll 55 promotes adhesion of the tacky unvulcanized rubber to the carcass.

To remove the end of segregated strip S from the surface of calender roll 41 after it has been segregated by trimming knives 45 and the leading end cut by cut-off roll knife 50, there is provided a transfer means 60. This transfer means may take the form of an arm 61 carrying at ats outer end a gripper head 62 which embodies vacuum or other gripping means such that upon the head 62 being moved adjacent the segregated strip, the strip can be gripped and thereupon the arm 61 moved to the dotted line position shown in FIGURE 2. In this dotted line position, the strip end is pressed against roll 55 and upon release of the strip from gripper head 62, the strip will continue along with the peripheral movements of roll 55. In the somewhat schematic illustration on FIGURE 2, the arm 61 is shown mounted so that it will swing head 62 from the full line position where it is ready to pick up the strip S to the dotted line position where it transfers the strip to roll 55 by release of the gripping action of head 62.

Before undertaking description of the overall operation of the apparatus, and the different operations performed at the individual material application stations, it should be advantageous to describe by reference to FIGURE 2 the manner in which one material application station operates. A batch of the desired rubber stock possessing the individual characteristics which are desired for forming the preselected portion of the tire that is to be built up at the station in FIGURE 2 is supplied to the bite of the calender rolls 41 and 42. As these rolls are driven, the material M is masticated and worked into the calendered sheet shown encircling roll 41. During this operation, the trimming knives 45 segregate a strip S of desired width by slitting along the sides of the strip.

When the tire carcass to which rubber material is to be applied is positioned opposite the calender 40 in FIGURE 2, as supported on mandrel 30 and by appropriate indexing of turret table 12, the cut-off roll knife 50 is operated to cut the leading end of the strip S that is to be applied. As this cut leading end moves to the top of calender roll 41, the transfer means 60 operates by head 62 picking up the leading end. Arm 61 thereupon moves the strip S to applying roll 55 where it releases the end of the strip and the rotation of the roll 55 carries the strip on around the top of the applying roll. The carcass C on mandrel 30 is lowered into engagement with the applying roll 55 by appropriate operation of actuator 35 and the strip S if firmly stitched against the surface of the carcass as the carcass rotates.

When a length of strip adequate to at least encircle the entire perimeter of the carcass or of sufficient length to give several turns on the carcass for the required depth of rubber has been supplied from the surface of calender roll 41, roll cut-off knife 50 again operates to cut the trailing end of strip S. The applying roll 55 continues to press the strip against the carcass until the trailing end passes over this roll at which state the carcass has at least one complete revolution of strip material applied thereto.

Referring to FIGURE 1, the tire carcass of built up fabric plies and beads such as conventionally prepared for application of the tread and sidewall rubber is mounted on the mandrel 30 which in the embodiment illustrated consists of a collapsible drum disposed at station No. 1. The turret table 12 is indexed, moving this loaded mandrel to station No. 2. This, of course, moves an empty mandrel into station No. 1 which empty mandrel is thereupon loaded with a tire carcass preparatory to the next indexing movement.

A strip S of unvulcanized rubber material of the desired rubber stock is applied to the carcass at station No. 2 by the various operations as described immediately hereinabove with reference to FIGURE 2 of the drawings. After this operation, the carcass on the mandrel 30 is raised by operation of actuator 35 and the turret table 12 indexed to move the carcass to station No. 3. The mandrel carrying the carcass is lowered and a further strip is applied, the mandrel and carcass again elevated and the turret table indexed to station No. 4.

At station No. 4, the tread shoulders are applied on top of the previously applied strips, these tread shoulders being applied in the form of two spaced strips which are disposed on the carcass so that in the finished vulcanized tire these spaced strips will supply the rubber that is formed by the mold into the shoulders of the tread. It may be pointed out that in connection with the calendar 40 which is used at station No. 4, lengths of segregated strip, sufficient to encircle the carcass several times and of a desired width that varies to give the exterior contour to the built up tread shoulders, are employed. The varying width of each tread shoulder strip can readily be obtained by programming the movements of the trimming knives toward or away from each other to segregate the desired width strip and several turns of each strip applied to get the required rubber depth while the strip width variation changes the coverage and positioning of the rubber on the carcass to assure the appropriate contour for the tread shoulder.

After the tread shoulder strips have been applied at station No. 4, the mandrel and carcass are again elevated and the turret table 12 indexed to move the carcass to station No. 5 where the drum is collapsed and the carcass removed therefrom for further processing of the tire.

It will be understood that once the apparatus has been in operation for several indexes of the turret table, each of the mandrels at stations Nos. 2, 3 and 4 will carry a carcass with each carcass being in a different stage of completion. Accordingly, each indexing of the turret table thereafter will produce a completed carcass for unloading at station No. 5 while a new carcass ready to have rubber applied thereto can be loaded at station No. 1.

It should be apparent from the above description of the operations carried out by the turret without the necessity of giving a detailed discussion of the showing on FIGURE 4 that using the different strips of rubber material, each possibly of a different tread stock, will give successively built up tire carcasses. This figure diagrammatically illustrates how each carcass on an expanded drum mandrel is built up in successive steps by the application of the rubber material strips at stations Nos. 2, 3 and 4 resulting in the completed carcass being ready for removal at station No. 5.

The novel method and apparatus of the present invention enables substantial reduction in the equipment requirements as well as in the requirements for special skilled personnel which were heretofore necessary in applying rubber material to tire carcasses. Additionally, an improved tire article may be obtained by employing the method and apparatus of this invention in that it is possible to individually select the desired rubber stock for each preselected portion of the tire where it will best be suited in use. In selecting these individual rubber stocks, the cost, the wear resistance and other characteristics of the stock may be considered together so that each selected portion of the tire rubber will be built up with the best rubber stock for that particular portion.

It is to be understood that the form of the invention herewith shown and described is to be taken as a preferred example of the same and that various changes in size, shape and arrangement of parts, etc. may be resorted to without departing from the spirit of the invention or the scope of the appended claims.

I claim:

1. Apparatus for applying unvulcanized rubber material directly to a tire body comprising
- a rotatable turret assembly with a plurality of stations spaced around the periphery thereof including a loading station and an unloading station,
- a tire body-supporting mandrel rotatably mounted on said turret assembly at each of said stations,
- a plurality of material application stations intermediate said loading and unloading stations,
- a calender at each of said application stations operable to produce a continuous calendered sheet of unvulcanized material,
- trimming means associated with each calender for segregating strip material of desired width from the continuous calendered sheet produced by such calender,
- and roll means for applying the segregated strip material from each calender to the tire body.

2. Apparatus as in claim 1, wherein application stations for applying sidewalls, tread base and tread shoulders are provided, and said trimming means at each of these application stations segregates strips from the respective calendered sheets of widths corresponding to the desired widths for the sidewalls, tread base and tread shoulders.

3. Apparatus as in claim 1, wherein said mandrel at each of said stations is movable to engage the tire body mounted thereon with said roll means, and said turret assembly is provided with indexing means to move each mandrel past each of said stations.

4. Apparatus as in claim 1, further comprising cut-off means for each calender to sever the segregated strip material from the calendered sheet following application of a desired length of strip material to the tire body.

5. Apparatus as in claim 1, further comprising transfer means operable to transfer the end of the strip material from each said calender to said roll means.

6. Apparatus as in claim 5, wherein said cut-off means includes a rotary roll carrying knife-means to press into the calendered sheet in cutting the ends of the segregated strip material on the calender.

7. Apparatus for applying unvulcanized rubber material directly to a tire body comprising
- a rotatable turret assembly with a plurality of stations spaced around the periphery thereof including a loading station and an unloading station,
- a rotatable mandrel on said turret to support the tire body during application of the material,
- at least one material application station intermediate said loading and unloading stations,
- a calender at said application station operable to produce a continuous calendered sheet of unvulcanized material, trimming means cooperable with said calender for segregating strip material of desired width from said continuous calendered sheet,
- roll means for applying said strip material to the tire body,
- and cut-off means mounted to sever said strip material from the calendered sheet following application of a desired continuous length of strip material to the tire body.

References Cited by the Examiner

UNITED STATES PATENTS

| | | | |
|---|---|---|---|
| 2,242,810 | 5/1941 | Bostwick | 156—406 |
| 2,253,781 | 8/1941 | Haase et al. | 156—111 |
| 2,407,152 | 9/1946 | Haase | 156—111 |
| 2,441,791 | 5/1948 | Bostwick | 156—406 |
| 2,649,134 | 8/1953 | Steinle | 156—128 |
| 2,771,388 | 11/1956 | Rocky et al. | 156—242 |
| 2,849,049 | 8/1958 | Hanson | 156—129 |
| 3,177,918 | 4/1965 | Holman | 156—130 X |

JACOB H. STEINBERG, *Primary Examiner.*

HAROLD ANSHER, ALEXANDER WYMAN, *Examiners.*